US007551888B2

(12) United States Patent
Kopra et al.

(10) Patent No.: US 7,551,888 B2
(45) Date of Patent: Jun. 23, 2009

(54) METHOD AND SYSTEM OF DISPLAYING CONTENT ASSOCIATED WITH BROADCAST PROGRAM

(75) Inventors: Toni Kopra, Vantaa (FI); Mikko Makipaa, Helsinki (FI); Akseli Anttila, Helsinki (FI)

(73) Assignee: Nokia Corporation, Espoo (FI)

( * ) Notice: Subject to any disclaimer, the term of this patent is extended or adjusted under 35 U.S.C. 154(b) by 507 days.

(21) Appl. No.: 10/511,771

(22) PCT Filed: Apr. 14, 2003

(86) PCT No.: PCT/FI03/00287

§ 371 (c)(1),
(2), (4) Date: Oct. 19, 2004

(87) PCT Pub. No.: WO03/090481

PCT Pub. Date: Oct. 30, 2003

(65) Prior Publication Data

US 2006/0014490 A1 Jan. 19, 2006

Related U.S. Application Data

(63) Continuation-in-part of application No. 10/319,475, filed on Dec. 16, 2002, which is a continuation-in-part of application No. 10/126,623, filed on Apr. 22, 2002.

(30) Foreign Application Priority Data

Jul. 1, 2002 (WO) ...................... PCT/IB02/02537

(51) Int. Cl.
*H04Q 7/20* (2006.01)

(52) U.S. Cl. .................. 455/3.05; 455/3.06; 455/414.3; 455/426.1; 455/556.1

(58) Field of Classification Search ................ 455/3.02, 455/3.05, 3.06, 414.3, 414.4, 73, 77, 150.1, 455/154.1, 503
See application file for complete search history.

(56) References Cited

U.S. PATENT DOCUMENTS 5,128,981 A 7/1992 Tsukamoto et al.

(Continued)

FOREIGN PATENT DOCUMENTS

EP 0 952 734 10/1999

(Continued)

OTHER PUBLICATIONS

U.S. Appl. No. 10/511,767, filed Oct. 19, 2004, Kopra et al.

(Continued)

*Primary Examiner*—CongVan Tran
(74) *Attorney, Agent, or Firm*—Hollingsworth & Funk, LLC

(57) ABSTRACT

A media system comprising a broadcast system, a telecommunication system, a content processing system, and a user terminal. While a media stream is broadcast, a group of content items associated with the media stream are generated. The content items are presented in the user terminal in a first mode, wherein a presentation element corresponding to a content item is changed to another presentation element according to the timing information of the content item, or in a second mode wherein a presentation element is changed to another presentation element in response to a user action. Transition from the second mode is allowed only by authorization according to a pre-defined procedure. The interactive operations are thus controlled by the user and thus not overridden by content timed or pushed to the user terminal for display.

28 Claims, 4 Drawing Sheets

U.S. PATENT DOCUMENTS

| | | | | |
|---|---|---|---|---|
| 5,337,044 | A * | 8/1994 | Folger et al. | 340/7.1 |
| 5,852,610 | A | 12/1998 | Olaniyan | |
| 6,035,202 | A | 3/2000 | Camp, Jr. | |
| 6,163,683 | A * | 12/2000 | Dunn et al. | 455/151.1 |
| 6,182,113 | B1 | 1/2001 | Narayanaswami | |
| 6,314,094 | B1 | 11/2001 | Boys | |
| 6,317,141 | B1 | 11/2001 | Pavley et al. | |
| 6,341,133 | B1 | 1/2002 | Kawamoto et al. | |
| 6,397,076 | B1 * | 5/2002 | Brown et al. | 455/521 |
| 6,463,469 | B1 * | 10/2002 | Yavitz | 709/219 |
| 6,560,640 | B2 | 5/2003 | Smethers | |
| 6,578,047 | B1 | 6/2003 | Deguchi | |
| 6,618,585 | B1 | 9/2003 | Robinson | |
| 6,628,928 | B1 * | 9/2003 | Crosby et al. | 455/77 |
| 6,657,989 | B1 | 12/2003 | Hilsenrath | |
| 6,658,231 | B2 | 12/2003 | Nakatsuyama | |
| 6,678,510 | B2 | 1/2004 | Syrjarinne et al. | |
| 6,829,475 | B1 * | 12/2004 | Lee et al. | 455/419 |
| 6,975,835 | B1 | 12/2005 | Lake et al. | |
| 6,993,326 | B2 * | 1/2006 | Link et al. | 455/414.1 |
| 7,031,696 | B2 | 4/2006 | Gerrits et al. | |
| 7,054,653 | B2 | 5/2006 | Jarvi et al. | |
| 7,076,202 | B1 | 7/2006 | Billmaier | |
| 7,111,314 | B2 | 9/2006 | Urdang et al. | |
| 7,151,540 | B2 | 12/2006 | Young | |
| 7,194,758 | B1 * | 3/2007 | Waki et al. | 725/141 |
| 7,243,131 | B1 * | 7/2007 | Inoue | 709/208 |
| 2002/0010789 | A1 | 1/2002 | Lord | |
| 2002/0016165 | A1 | 2/2002 | Davies et al. | |
| 2002/0055343 | A1 | 5/2002 | Stetzler et al. | |
| 2002/0056087 | A1 | 5/2002 | Berezowski et al. | |
| 2002/0058530 | A1 | 5/2002 | Akama | |
| 2002/0102954 | A1 | 8/2002 | Kaneko | |
| 2002/0105976 | A1 | 8/2002 | Kelly et al. | |
| 2002/0141491 | A1 | 10/2002 | Corts | |
| 2002/0144641 | A1 | 10/2002 | Inagaki et al. | |
| 2002/0152267 | A1 | 10/2002 | Lennon | |
| 2002/0162118 | A1 | 10/2002 | Levy et al. | |
| 2002/0174431 | A1 | 11/2002 | Bowman | |
| 2002/0183059 | A1 * | 12/2002 | Noreen et al. | 455/427 |
| 2003/0005433 | A1 | 1/2003 | Janik et al. | |
| 2003/0006911 | A1 | 1/2003 | Smith et al. | |
| 2003/0018971 | A1 | 1/2003 | McKenna et al. | |
| 2003/0040302 | A1 | 2/2003 | Okada | |
| 2003/0060157 | A1 | 3/2003 | Henrick | |
| 2003/0061110 | A1 | 3/2003 | Bodin | |
| 2003/0067554 | A1 | 4/2003 | Klarfeld et al. | |
| 2003/0069033 | A1 | 4/2003 | Edge et al. | |
| 2003/0108022 | A1 | 6/2003 | Yamamoto | |
| 2003/0158777 | A1 | 8/2003 | Schiff et al. | |
| 2003/0162495 | A1 | 8/2003 | Yonemoto | |
| 2003/0177503 | A1 | 9/2003 | Sull et al. | |
| 2003/0181160 | A1 | 9/2003 | Hirsch | |
| 2004/0014454 | A1 | 1/2004 | Burgess et al. | |
| 2004/0049779 | A1 | 3/2004 | Sjoblom et al. | |
| 2004/0098386 | A1 | 5/2004 | Thint et al. | |
| 2005/0144641 | A1 | 6/2005 | Lewis | |
| 2005/0170799 | A1 | 8/2005 | Stranberg et al. | |
| 2005/0227679 | A1 * | 10/2005 | Papulov | 455/414.3 |
| 2005/0243784 | A1 | 11/2005 | Fitzgerald | |
| 2005/0281237 | A1 | 12/2005 | Heinonen et al. | |
| 2006/0288374 | A1 | 12/2006 | Ferris et al. | |

FOREIGN PATENT DOCUMENTS

| | | | |
|---|---|---|---|
| EP | 0 996 245 | A2 | 4/2000 |
| EP | 1 091 584 | A2 | 4/2001 |
| EP | 1 096 743 | A1 | 5/2001 |
| EP | 1191722 | | 3/2002 |
| JP | 2002-344933 | | 11/2002 |
| JP | 2003-125428 | | 4/2003 |
| WO | WO 99/04568 | | 1/1999 |
| WO | WO 99/35839 | | 7/1999 |
| WO | WO 01/20908 | A1 | 3/2001 |
| WO | WO 01/45308 | | 6/2001 |
| WO | WO 01/55889 | A1 | 8/2001 |
| WO | WO 01/99411 | | 12/2001 |
| WO | WO 01/99421 | | 12/2001 |
| WO | WO 02/17117 | A2 | 2/2002 |
| WO | WO 02/19701 | A1 | 3/2002 |
| WO | WO 02/37753 | | 5/2002 |
| WO | WO 02/37869 | A2 | 5/2002 |
| WO | WO 02/47391 | A1 | 6/2002 |
| WO | WO 02/054769 | | 7/2002 |

OTHER PUBLICATIONS

U.S. Appl. No. 10/511,768, filed Oct. 19, 2004, Kopra et al.
U.S. Appl. No. 10/511,797, filed Oct. 19, 2004, Kopra et al.
U.S. Appl. No. 10/511,815, filed Oct. 19, 2004, Kopra et al.
"Give me smart radio now," http://smartradio.mediacorpradio.com, Feb. 20, 2002.
"ETS 300 401—Radio broadcasting systems; Digital Audio Broadcasting (DAB) to mobile, portable and fixed receivers", May 1997. European Telecommunication Standard. Second Edition. ETSI, EBU, CENELEC. Data Retrieved: Feb. 9, 2009. <http://www.rthk.org.hk/about/digitalbroadcasting/DSBS/DABETS300401.PDF>.

* cited by examiner

METHOD AND SYSTEM OF DISPLAYING CONTENT ASSOCIATED WITH BROADCAST PROGRAM

RELATED APPLICATIONS

This is a continuation-in-part application of application Ser. No. 10/126,623, filed on 22 Apr. 2002, and a continuation-in-part application of application Ser. No. 10/319,475, filed on 16 Dec. 2002.

FIELD

The invention relates to presenting content associated with broadcast program in a user terminal of a telecommunication system.

BACKGROUND

Media broadcasters, such as television and radio, have taken steps to provide audience with digital supplementary services, such a program information, news, weather information, competitions and other related content, in addition to a traditional media stream. These digital supplementary services are usually delivered over the Internet using audiences' personal computers or other devices capable of connecting to the Internet.

Radio and television stations often deliver content of the content providers through their service and collect revenues out of content sales. Already, broadcasters are offering ringing tones and logos on their web sites, which are delivered to a user from the content provider's system. The user is required to take up the task of navigating to the broadcaster web site to access the information on content available, and how to acquire or purchase it. The broadcasters have to promote the web address in the broadcast to attract users to visit the web site.

There are, however, problems related to acquiring, delivering and presenting broadcast related content by the listeners of the program. Often, people do not have a PC with Internet access when they are receiving the broadcast. Additionally, navigating a way through a complicated Internet web structure to the correct service address is laborious and time consuming. Acquiring, for example, of a ringing tone requires the user to send a text message to a defined service number with a service code and content identification string. The service codes and identification strings are difficult to remember. The complexity in accessing the service results in a high barrier to connect a user to a service and low ratings of the service.

BRIEF DESCRIPTION OF THE INVENTION

An object of the present invention to provide an improved method and related apparatus for presenting content associated with a broadcast program in the user terminal. The objects of the invention are achieved by a method and apparatus which are characterized by what is stated in the independent claims 1, 10, 19, and 27. The preferred embodiments of the invention are disclosed in the dependent claims.

The invention is based on the idea of arranging two reception modes, one for interactive user operations and one for the default operation executed according to a defined order timed according to the broadcast program. Furthermore, the transition from the mode for interactive user operations is disabled unless appropriately authorized.

An advantage of the invented solution is that the interactive operations are in control of the user and are thus not overridden by content timed or pushed to the user terminal for display.

BRIEF DESCRIPTION OF THE DRAWINGS

In the following the invention will be described in greater detail by means of preferred embodiments with reference to the attached drawings, in which.

DESCRIPTION OF EMBODIMENTS

Figure 1:
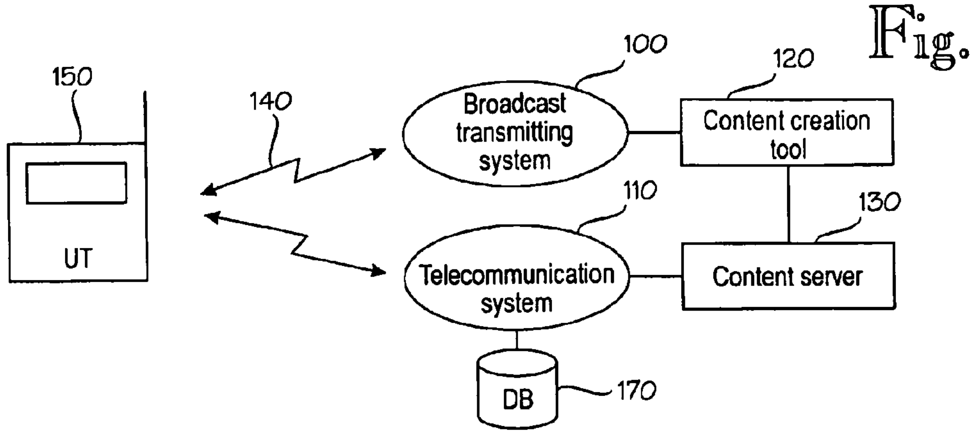
FIG. 1 illustrates the basic elements of the first embodiment of the invention.

FIG. 1 illustrates the basic elements of the first embodiment of the invention. The media system (MES) 10 refers to any communication system that generates information for transmission over the air interface to a user terminal (UT) 150. The MES 10 comprises a broadcast transmitting system 100, a telecommunication system 110, a content creation tool 120, and a content server 130. The broadcast transmitting system 100 provides a program service, i.e. a media stream transmitted over the air in a broadcast channel 140, which is typically accessible to a plurality of user terminals 150. The broadcast transmitting system 100 can be construed as a cable TV network, a satellite TV network, a radio frequency TV network, a radio cable or terrestrial network, and/or any TV or radio network capable of transmitting a media stream to a plurality of broadcast receivers. The media stream may comprise, for example, a radio or TV program.

The telecommunication system 110 provides the user terminal 150 with an access to external networks, hosts, or services offered by specific service providers. In the following, the invention will be described using the terms and elements of the combined structure of the GSM (Global System for Mobile Communications) and GPRS systems (General Packet Radio Service), and the telecommunication system is thus referred to as a radio system. The radio system 110 here refers generally to a telecommunications system that provides a wireless access to the system. Typically the access point of the wireless access can change when user terminals move within the service area of the system. A typical radio system is a Public Land Mobile Network (PLMN). The invention may, however, be applied in connection of any other mobile radio system that provides bidirectional data communication. Examples of such systems are PCS (Personal Communication System) and DCS 1800 (Digital Cellular System for 1800 MHz), TETRA (Terrestrial Trunked Radio), and third generation mobile systems, such as UMTS (Universal Mobile Communication System) and IMT-2000 (International Mobile Telecommunication System 2000). It should be noted that the invention can also be applied to fixed systems, for example to the PSTN (Public Switched Telephone Network), local area networks, and wide area networks, though the advantages of the invention are more imminent in mobile communication environment.

The content server 130 and the content creation tool 120 facilitate generation and/or delivery of information associated with the program service from the broadcast transmitting system 100 to the radio system 110 and vice versa. This information is provided to the user terminal 150 through the wireless access of the radio system 110, hereinafter referred as a parallel channel 160. This parallel channel 160 may be used to deliver information associated with the content of the program service of the broadcast transmitting system 100 for display in the user terminal 150 timed according to the broadcasted program.

Figure 2:
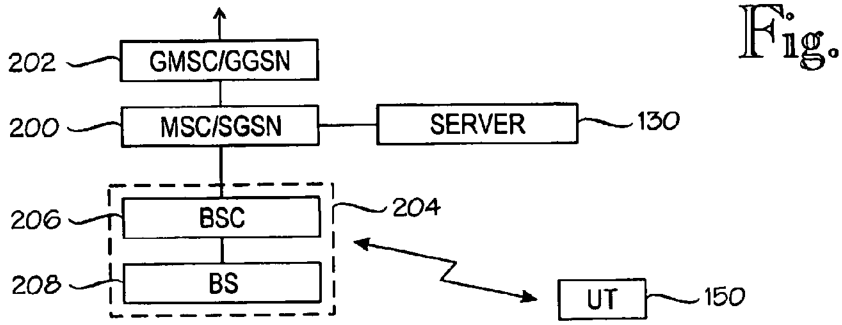
FIG. 2 illustrates the structure of a telecommunication system.

FIG. 2 shows the logical structure of a radio system 110 that, as such, is known to a person skilled in the art. For clarity's sake, only the network elements necessary for describing the embodiment are shown. In the embodied solution the radio system 110 corresponds to the combined structure of the GSM (Global System for Mobile Communications) and GPRS systems (General Packet Radio Service). The GSM network elements are responsible for the implementation of circuit-switched connections, and the GPRS network elements for the implementation of packet-switched connections, some of the network elements, however, being shared by both systems.

A centre 200 represents a mobile services switching centre (MSC) and a serving GPRS support node (SGSN) that enable circuit-switched and packet switched signaling, respectively, in the radio system. The radio system may further comprise a gateway unit 202, which represents a gateway mobile service switching centre (GMSC) and a gateway GPRS support node (GGSN). The GMSC attends to the circuit-switched connections between the core network and external networks, such as a public land mobile network (PLMN) or a public switched telephone network (PSTN), and the GGSN attends to the packet-switched connections between the core network and external networks such as the Internet.

The centre 200 controls a radio access network (RAN) 204, which comprises at least one base station controller 206 that controls at least one base station 208. The base station controller 206 may also be called a radio network controller, and the base station may be called a node B. A user terminal 150 communicates with at least one base station 208 over a radio interface.

The radio system 110 is connected to a server 130 that in FIG. 2 is shown connected to the centre 200. However, the content server 130 may also be connected to the gateway 202 or to some part of the RAN 204. It is also possible that the server 130 communicates with the radio system over the radio interface in the same manner as the user terminal 150.

The parallel channel is opened by creating a connection with the server 130. This is typically created from the user terminal. A packet switching method is suitable for data transmission where the data is transmitted in bursts. In such a case, it is not necessary to allocate a data link for the entire duration of transmission; only for the time it takes to transmit the packets. This reduces costs and saves capacity considerably. Thus, a packet data connection (GPRS) is shown in this embodiment, though basically a circuit switched connection is applicable as well.

Based on the received information from the broadcast transmitting system 100 the content creation tool 120 generates a first signal associated with information on the program service. The information can comprise, for example, an object identification relating to the media stream, data about the music played at the moment, a time table of the program, DJ's message to the listeners or the like.

The first signal enters a content server 130, which now serves as a gateway to the radio system 110. The content server 130 processes the first signal received from the broadcast system 100, and based on the received information on the program service generates a second signal that carries a content package comprising one or more content items for displaying on the terminal screen. The content server 130 feeds the second signal to the radio system 110, and the signal is transmitted to the user terminal 150.

It should be noted that the first signal from the content creation tool 120 to the user terminal 150 may alternatively be sent to user terminals utilizing the RDS (Radio Data System) provided that the user terminal has a receiver for the RDS signal. The RDS signaling can be utilized on the FM broadcast since the RDS information is encoded in the FM signal.

If the signal is sent to the user through the radio system, it should be noted, that the user does not mandatorily have to be able to receive or to be aware of the broadcast program; it is enough that the user can receive the content items through the parallel channel. Naturally in this case the user terminal 150 does not necessarily need to be equipped with a receiver of the broadcast system.

Primarily a content item is shown to the user according to a pre-defined order and timing, substantially synchronized to the program of the broadcast system it is associated with. For example, a content item showing the name and the artist of a song may be displayed in the user terminal at the moment the song starts playing in the broadcast. If more than one content items are associated with the program, their mutual structure and timing is generally defined as well. However, a user receiving the parallel channel or a RSD signal has furthermore an opportunity for interactive communication. In the embodied solution this opportunity is realized by providing the user with a on-screen button that is displayed in the user terminal 150. The on-screen button is incorporated in the displayed content item and corresponds to a content object identification so that pressing of the button initiates a request of uplink data transmission, and generates an uplink signal including a content object identification from the user terminal. The uplink signal is transmitted from the user terminal 150 through the radio system 110 to the content server 130 that forwards the request to a destination derived according to the content object identification.

For example, let us assume that the content item comprises an offer on a deliverable content object, which may be purchased over the air. The content object may comprise, for example, a text string, a picture, a video clip, an audio clip, a game, a logo, a screen saver, a ringing tone, or the like, a series of these or any combination thereof. The parameters required for delivering and purchasing are included in the object identification that has been received by the user terminal 110. If the user pushes the on-screen button in the screen, an uplink signal is generated, and forwarded to the object provider's delivery system, using the parameters comprised in the object identification. If the object provider is an operator, the object can locate in an object database 170, which may thus be a part of the radio system 110, as shown in FIG. 1. The content object can be also provided by a maintainer of the content server 130, which in that case may include the object database 170. Alternatively, the object may be provided by the broadcaster, and hence, the object database 170 may also be a part of the content creation tool 120.

Figure 3:
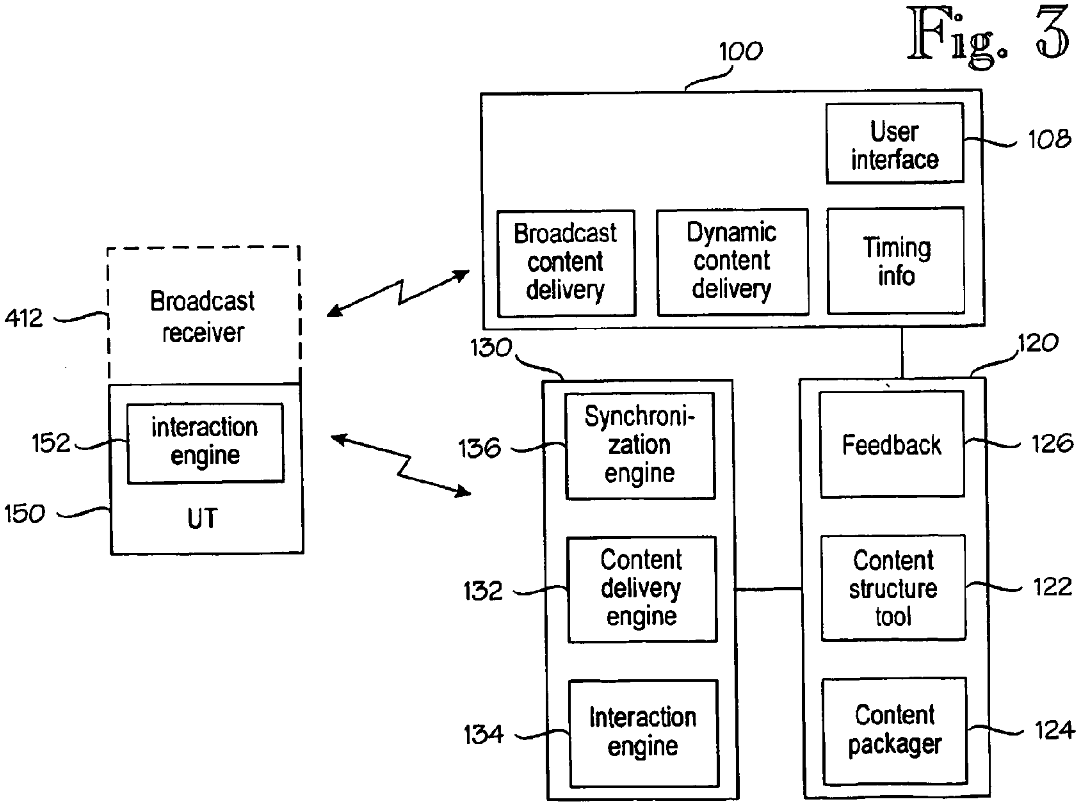
FIG. 3 shows a more detailed structure of the embodied media system.

FIG. 3 provides a diagrammatic representation of the elements of the broadcast transmitting system 100 and of the content server 130. It should be noted that the elements are described as logical elements, and the description should thus not be interpreted to restrict the physical implementation of the units.

Broadcast Transmitting System

The broadcast transmitting system 100 of FIG. 3 comprises broadcast content delivery module 102, a timing information module 104, a dynamic content delivery module 106, and a user interface 108.

A broadcast content delivery module 102 generates and transmits the media stream comprising the broadcast program to a broadcast receiver 412, such as FM radio receiver, TV set receiver, or the like. The receiver may also be comprised in the user terminal 150. The broadcast content delivery module 108 of a radio station typically comprises a sophisticated digital content management system to compile and run a broadcast program. Examples of such content management systems are RCS's Master Control and Jutel's RadioMan. A broadcast may include FM transmission, AM transmission or digital radio or television transmission, or the like.

The timing information module 104 generates timing information for synchronizing the contents in the broadcast channel and in the parallel channel. The timing information module 102 embodied here may provide, for example, information on the starting time and the ending time of a particular program, as well as information on timing of advertising breaks etc.

The dynamic content delivery module 106 may provide additional dynamic content information related to the broadcast program. Such dynamic content information may comprise, for example, results of events in the broadcast, such as the name of a winner in a quiz show, or the like. If such content information is generated during the program, for example, in live events, sports coverage or in broadcast radio, the content information is transferred to the content creation tool 120 by the dynamic content delivery module 106. In addition, the dynamic content delivery module 106 may receive interaction results from the content server 130 to be used as part of the broadcast, for example, to display the results of a vote on the TV as a video overlay.

The broadcast transmitting system 100 may also provide a user interface 106. The user interface 106 is used for outputting the received interaction results from the content server 130 to the broadcasting personnel.

Content Creation Tool

The content creation tool 120, which in this embodiment can also be called a visual radio tool, allows creating a visual, acoustic or tactile presentation and manage presentation of it in the user terminal timed according to the broadcast program. The content creation tool 120 forms the content items that are provided to the user terminal for outputting. In addition, the content creation tool allows managing interactive elements, such as delivering and purchasing objects, voting and quizzes. The content creation tool 120 may locate in the broadcaster's premises, for example in a radio or in a television station, and be integrated to the broadcast transmitting system 100 so as to form an integrated broadcast system. The content creation tool 120 may also be used to define a user navigation structure within the parallel channel. The user navigation structure refers to a sequential order of a group of content items associated with the same program, or of object identifications in the same content item.

The content creation tool 120 comprises a content structure tool 122, content packaging module 124, and a feedback module 126. The content structure tool 122 may receive information from the dynamic content delivery module 106, and from the timing information module 104 of the broadcast transmitting system 100. The content structure tool 122 attaches timing to content items so that a content item may be output in a user terminal 150 synchronized to the media stream of the broadcast program (for example, show the identification of this object on the screen of the user terminal at 14:43:02 after the beginning of the program). The content structure tool 122 provides the layouts for displaying the content items, thereby defining their appearance on the screen. Furthermore, the content structure tool 122 may define the delivery of content items to the user terminal in accordance with the broadcasting time line of the media stream.

The content packaging module 124 may receive information from the dynamic content delivery module 106, and from the timing information module 104 of the broadcast transmitting system 100. Based on the content structure definition by the content structure tool 122, it creates a content package for delivery to the user terminal 150, comprising content items carrying the individual content objects to be displayed, such as text strings, graphic file objects, animations, video clips, etc.

The feedback module 126 is arranged to the content creation tool 120 for processing the interaction signals from the users. User responses that are sent from the user terminal through the radio system to the server 130 are fed to the feedback module 126 in the content creation tool 120. Based on the responses, the feedback module 126 formats a presentation that may be fed to the broadcasting personnel through the dynamic content delivery tool 106 and user interface 108 of the broadcast transmitting system 100, or as a new dynamic content item to be included in the broadcast program.

Content Server

The content server 130 provides an access point and thus controls the content flow to and from the user terminal. It facilitates a timed delivery of content items and/or packages to the user terminal, as well as collecting and forwarding of interaction results from the radio system 110 to the broadcast system 100. The content server 130 may also control, and if necessary limit the number of users using the parallel channel at the same time.

The content server comprises a content delivery engine 132, an interaction engine 134, and a synchronization engine 136. The content delivery engine 132 receives a content package comprising one or more content items created by the content packager 124 of the content creation tool 120. The content package is fed from the content delivery engine 132 to the interaction engine 134, which sends a signal comprising said content package through the radio system 110 to the user terminal 150. Prior to sending the content package the content may be adjusted to the capabilities and the screen size of the receiving user terminal. This requires that the capability information of the user terminal has been signaled to the content server, for example, at connection setup.

It is possible that one content package is associated with one program and delivered to the user terminal before the program starts. This is appropriate when dealing with preplanned and recorded shows and programs, where the content and content timeline are relatively accurately known in beforehand. The content associated with one program may alternatively be delivered in a package that contains both the user terminal software module in a suitable format, such as a Java MIDlet and the content package for a particular program. In this case, dynamic content may be delivered in addition to the preliminarily delivered content package to deal with variations in content during the broadcast. Alternatively, the package may correspond to a segment of the program. This approach is suitable for, for example, FM radio, where the play list is often more dynamically designed.

The synchronization engine 136 receives timing information from the timing information module 104 of the broadcast transmitting system 100, and utilizes that to manage the transmission of content packages to the user terminal. In addition, the synchronization engine 136 allows the user terminal 110 to synchronize their clocks to broadcast system time references by running a synchronization algorithm. These control events may be communicated through a synchronization engine 136 to an interaction engine 152 of the user terminal 150 and the synchronization engine 320 may thus adjust parallel channel timing accordingly.

The interaction engine 134 receives responses from the user terminal and forwards them to the content object provider according to the received object identification. In addition, the interaction engine 134 may collect the interaction responses from the user terminals and feed them to broadcast transmitting system 100 through the feedback module 126 of the content creation tool 120, dynamic content delivery module 106 and user interface 108 of the broadcast transmitting system 100. The interaction engine 134 may also create and store statistics of the number of the users as well as the activity to participate in interactions.

Mobile

Figure 4:
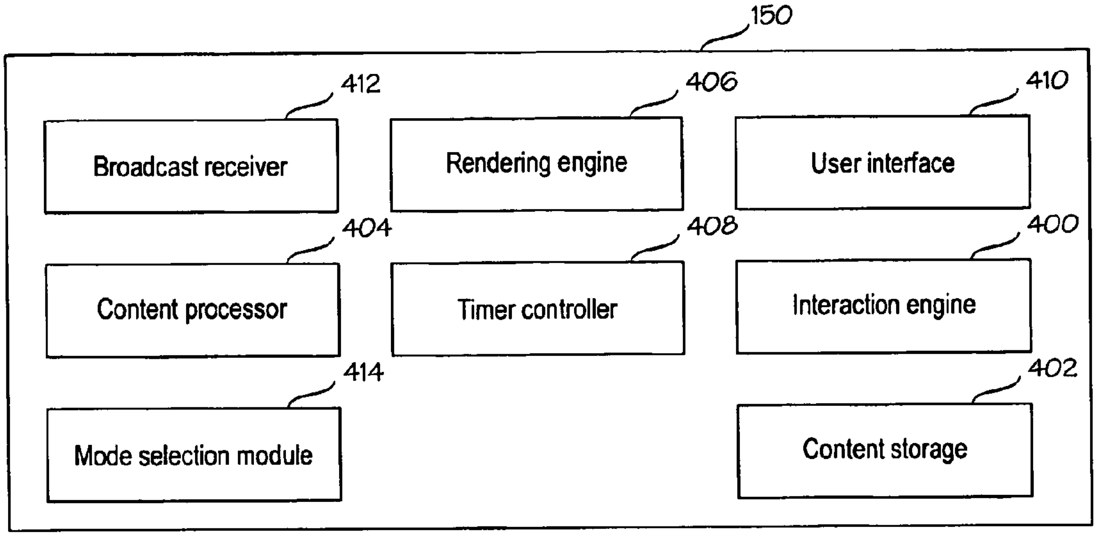
FIG. 4 illustrates elements of a user terminal.

FIG. 4 illustrates in more detail a user terminal 150, which comprises substantially conventional components, including wireless modems, processors, a memory, a user interface, a display, etc. In addition, the user terminal may include a broadcast receiver 412, such as TV or radio tuner, video streaming engine, etc. The user terminal is usually a mobile or a cellular telephone, but may also be, for example, a laptop computer, personal digital assistant or the like.

The user terminal 150 includes a specific software module (400 to 410) for providing the parallel channel functionality. This module can be implemented using a native operating system such as, for example, Symbian, or using a programming environment, such as, for example, Java MIDP.

A content package from, for example, the server interaction engine 134 or as a broadcast is received to the user terminal 150 through the interaction engine 400. The received content package is stored in a local memory, a content storage 402. The content packages may be stored in a content storage 402 as a background process, so that content information is available for a content processor 404 and for a rendering engine 406 when needed. Default information can also be stored in content storage of the local memory 402 to be shown in case dynamic content for some reason is not available to the user terminal 150.

The rendering engine 406 provides visual, acoustic and/or tactual effects to be output according to the content item to the user.

The reception of the parallel channel can be initiated in several ways. The user may activate a functionality, which enables the user terminal to receive and display the content items coming from the broadcast system either through the radio system, or as an RDS broadcast. If the user terminal includes a broadcast receiver, instead of manual initiation, the user terminal may also be programmed to automatically initiate the reception of the content items over the parallel channel and display them on the terminal screen whenever the user selects a particular broadcast channel.

In initiating the reception of the parallel channel in the user terminal 150, the user terminal 150 transmits information about itself to the content server 130. The information may comprise data indicating the variant of the user terminal, which enables adjusting the content items to contain, for example, graphic objects optimized to the capabilities of the particular user terminal.

The timer controller module 408 may run a synchronization algorithm with the content server 130 to synchronize an internal clock of the user terminal to the internal clock of the server. A simple synchronization algorithm can be used, based on calculating round trip delays of requests sent to content server 130 by the user terminal 110, and on calculating the difference between the user terminal clock and the server clock. Once the user terminal 150 has performed synchronization and the starting time of a program is known, media stream timeline references may be translated to references in the internal clock of the user terminal 150.

The timer controller module 408 is thus aware of whether the program has already started and what is the current time line position. If the program is running, the timer controller 408 may thus automatically find a correct content item in the parallel channel to be displayed in the user interface 410.

Once the use of parallel channel is activated and the user terminal has received a content item to be shown at a particular time, the content processor 404 may start executing. The processor 404 reads the content structure definition in the content storage 402 to determine the current content item to be displayed and communicates the content item and a related layout to the rendering engine 406 for display in the user interface 410. Based on the content structure definition, the content processor 404 informs the timer controller module 408 to create timer events, for example displaying of a next content item according to content structure. In such a case the processor 404 reads the structure definition in the storage 402, determines the content item to be displayed, and a related layout, and sends them to a user interface 410 to be displayed. A combination of the content item and a layout is hereinafter called a slide.

When the displayed slide provides a possibility for the user to interact, for example, by means of selecting an on-screen button, entering text to a text entry slot, or a defined key combination, or the like, a signal having information on the action is communicated from the user interface 410 to the content processor 404. The content processor 404 analyses the action and based on the analysis triggers a related transaction. The signal of the user action is communicated from the content processor 404 to the interaction engine 400 of the user terminal, which transmits the signal through the radio system 110 to the database 170 and possibly also to the interaction engine 134 of the server 130. In case the interactive action is activated using an object identification, the user activity triggers communication from the user terminal 150 to the server 130 automatically and the user does not need to know a long list of service numbers, service codes or identification strings.

In practice there has appeared a problem with the parallel usage of alternative types of content. As the processor 404 reads the structure definition in the content structure memory 402, and sends the current content items and layouts to a user interface 410 to be displayed it follows an order pre-defined with the content creation tool. If the display, due to this, is suddenly changed, while the user is still in the middle of an interactive procedure, for example activating a purchase request, paying a purchase, or viewing some information, this creates irritation, and possible uncertainty of the payment operation. This has been considered to severely degrade the user experience of the proposed solution This is overcome in the embodied solution as shown in FIG. 4. The user terminal 150 of the media system 10 is further equipped with a mode selection module 414, preferably a software module, that allows the user terminal 150 to operate in a first mode and in a second mode. In the first mode the user terminal displays content items and layouts from the content storage 402 according to a defined order, based on the timing of the broadcast transmitting system 100. In the second mode each slide is displayed in response to a user action, for example, through the user interface 410 of the user terminal. Furthermore, the content processor 404 is configured not allow a transition from the first mode to the second mode without an appropriate authorization. In the first embodiment of the solution the defined order is the pre-defined timing of the slides, and authorization for the mode transition is given by the user. An authorization may be given by entering, for example, through the user interface a user action that ends the interactive procedure, and thus allows displaying the content according to the pre-defined synchronization. Such an user action may be, for example, pushing a on-screen button <Finished>. Alternatively, an authorization may be executed by remaining passive for a while so that the duration of inactivity exceeds a pre-defined time limit. Authorization may also be enabled by a defined authorization signal generated by the content server 130.

The second mode primarily relates to a user interaction, more specifically the user terminal interacting with the content server 130 or servers accessible to it and thereby retrieving information or content objects from external service providers (browsing). Preferably this is realized with the help of a displayed content object identification, as disclosed earlier. However, it should be noted that one content package may comprise a structure that, in addition to the pre-defined, synchronized structure, provides alternative sequences of content items for the user to choose from. Accordingly, even though there is no interaction for data retrieval with the server, the terminal may, in such a case, operate in the second mode.

Figure 5:
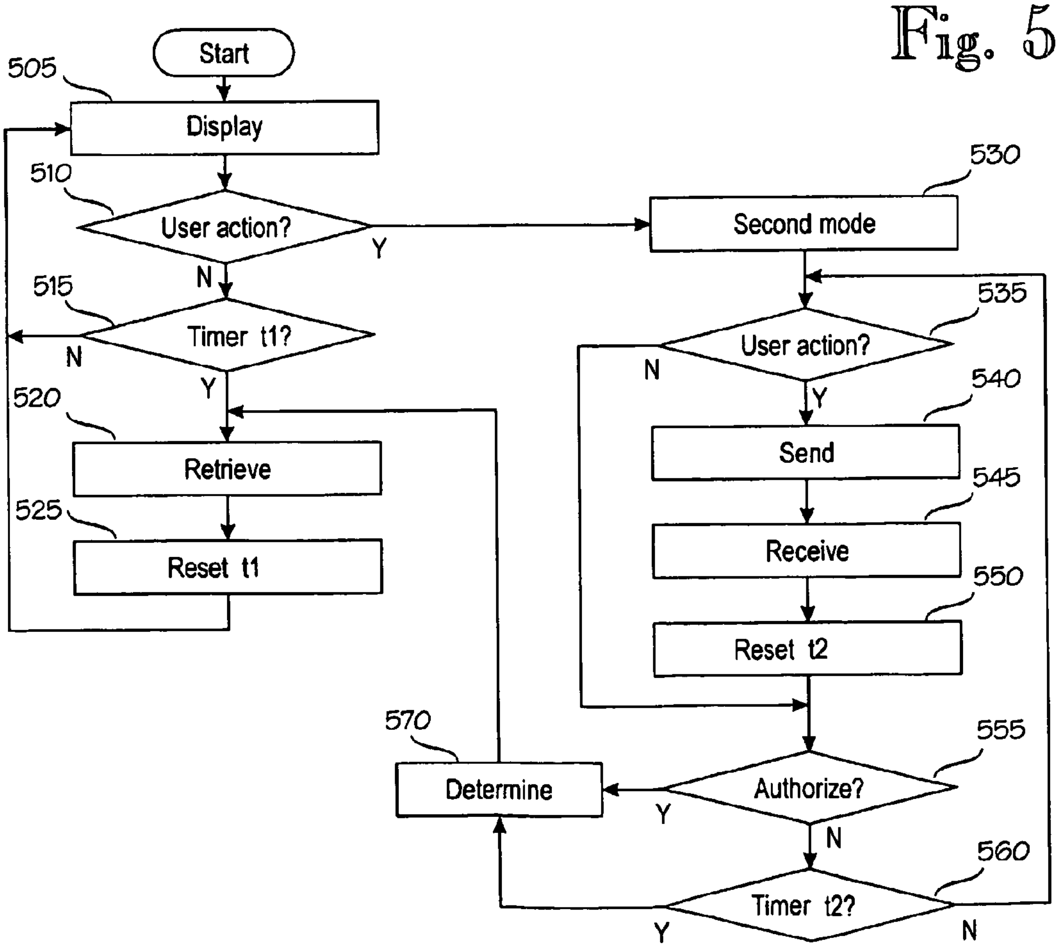
FIG. 5 illustrates the embodied method for displaying information received in the parallel channel.
Figure 6:
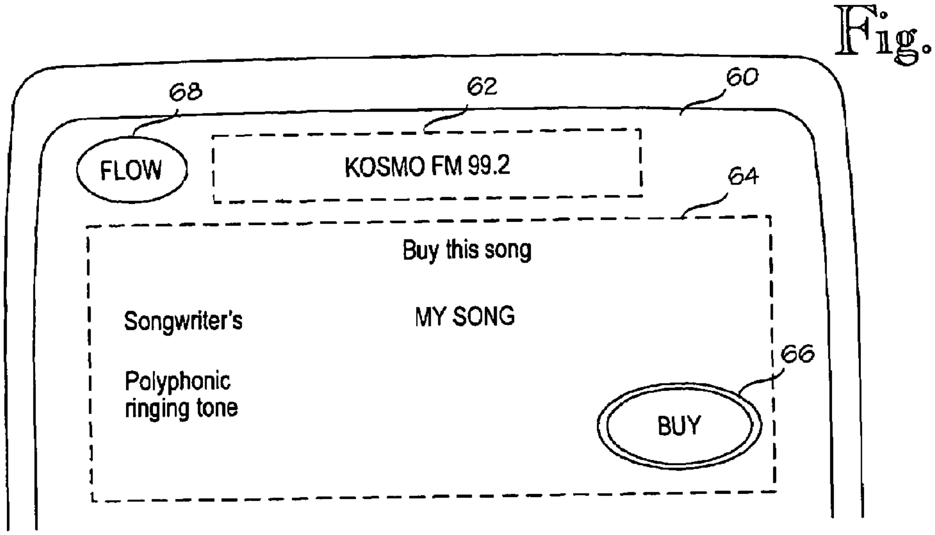
FIG. 6 illustrates a screen of the user terminal displaying a first content item.

FIG. 5 illustrates the embodied method for displaying information received in the parallel channel. The procedure begins in the situation where a first slide is retrieved from the content storage 402 and displayed on the screen of the user terminal, i.e. the user terminal operates in the first mode. The display of the content item has been defined to take place for the duration of T1, unless interrupted by an interactive functionality initiated by the user. FIG. 6 illustrates the related screen 60 of the user terminal displaying the first content item. The first slide provides a view in a form of a repetitive template 62 that acts as a frame that is complemented with the changing data of the content item 64. The illustrated content item 64 also comprises an object identifier, which leads to the slide comprising an on-screen button 66. In the illustrated embodiment the on-screen button provides a possibility to purchase a ringing tone of the song currently broadcast in the radio. The first slide may also provide an indicator 68 showing the mode the terminal is operating in. When the user terminal begins to display the slide (step 505), a synchronization timer is started. In case the user is not interested in the ringing tone (step 510) and thus does not activate the on-screen button, the procedure will continue by checking that the timer t1 count has not exceeded the pre-defined time limit T1 (step 515). As long as the threshold T1 has not been exceeded, the slide will be displayed in the screen (step 505). When the threshold T1 is exceeded (step 515), a new slide will be retrieved from the content storage (step 520). The timer is reset (step 525), and the procedure will continue from step 505.

However, in case the user activates the on-screen button (step 510), the user terminal will change into the second mode (step 530). It may be possible that additional user action, for example in the form of confirming the transaction is necessary (step 535). If the confirmation is not received, the procedure will continue from step 555 by checking whether the transition back to the first mode is authorized by the user. If the confirmation is received, the specific module of in the user terminal 150 sends a transaction signal (step 540) to the database 170 of the object provider. In the database 170 of the object provider the user terminal is identified by the received transaction signal. The database sends in return to the request a signal with the ordered object using a suitable delivery channel of the radio system. When the user terminal 110 receives (step 545) the signal with the object it notifies the user. The object can be saved in the memory of the user terminal and shown to the user. While the transaction is ongoing the timer is not checked and even if the threshold T1 of the first slide would be exceeded, the interactive procedure will not be interrupted. After the transition is completed, the inactivity timer of the user is reset (step 550) and it is checked whether the transition back to the first mode is authorized by the user (step 555). If the authorization is explicitly received by a user action the procedure will immediately continue from step 570 by determining, according to the timing of the slides, which slide should be displayed, and then move to step 520 of retrieving the slide from the content storage for display. If the authorization is not received, it is checked (step 560) whether the inactivity timer t2 has exceeded a pre-defined threshold T2. If not, the procedure will continue from step 535 by waiting for new information from the user. If yes, the procedure will continue from step 570 by determining, according to the timing of the slides, which slide should be displayed, and then continue from step 520.

The procedure of FIG. 5 shoes the basic elements of the embodied method, and may be varied in may ways. For example, as shown above, a content package may comprise a group of content items associated with timers t1, and arranged into a hierarchic structure. Separate timers may be associated to these separate hierarchic structures and to the overall hierarchic block of the whole content package.

Figure 7A:
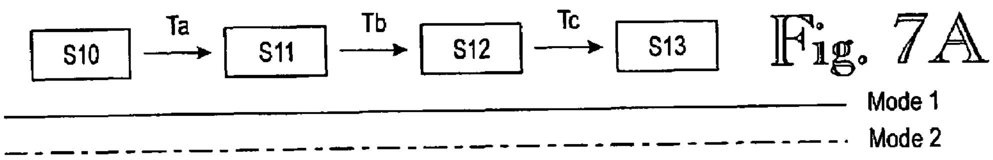
FIGS. 7A to 7D show the division between the first mode and of the second mode in more detail.

In FIGS. 7A to 7D the division between the first mode and of the second mode is discussed in more detail. FIG. 7A shows a sequence of slides, delivered to the user terminal in one content package. The content items comprise the information displayed in slides S10 to S14, and the content structure information defines the timing Ta to Tc between the successive slides. As depicted in FIG. 7A, in the first mode the slides are displayed in a sequence timed according to the pre-defined synchronization Ta to Tc.

Figure 7B:
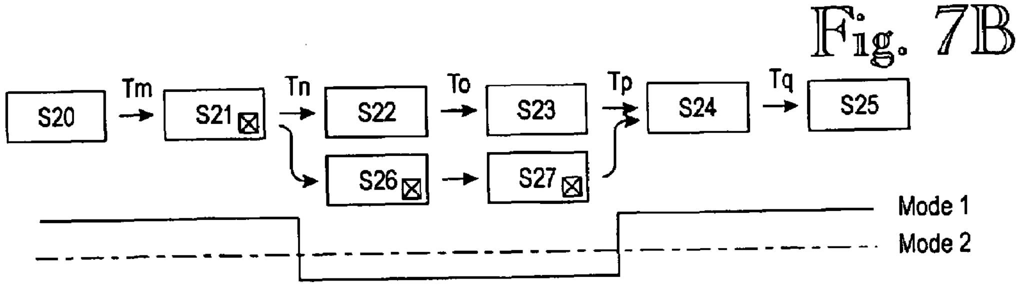

FIG. 7B shows a corresponding group of slides S20 to S27 delivered to the user terminal in one content package. The content structure provides a diversion from S21 to either S22 or S26 by choice of the user. In case the user does not activate the on-screen button of S21, the user terminal will operate in the first mode and the sequence of slides S20 to S25 will be displayed in the pre-defined order according to the pre-defined timing Tm to Tq. However, in case the user activates the on-screen button of S21, the user terminal will enter to the second mode, where he or she may navigate through the slides S26 to S27 by activating the on-screen buttons comprised in the slides. The on-screen button in slide S27 comprises an object identification to terminate the browsing of the slides, and the terminal will re-enter the first mode by the user activating the button. As discussed earlier, the terminal may also enter the first mode if the user remains inactive longer than a pre-defined time period.

Figure 7C:
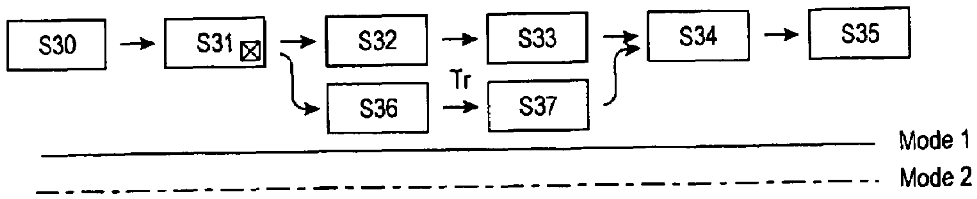

FIG. 7C shows a group of slides S30 to S37 that differs from slides S20 to S27 in FIG. 7B by the timing arranged between slides S36 and S37. This means that by activating the on-screen button of S31 the user may actuate a change to the display order of the slides, but actually since the display of slides S36 and S37 follows a pre-defined synchronization, the terminal stays in the first mode throughout the studied time period.

Figure 7D:
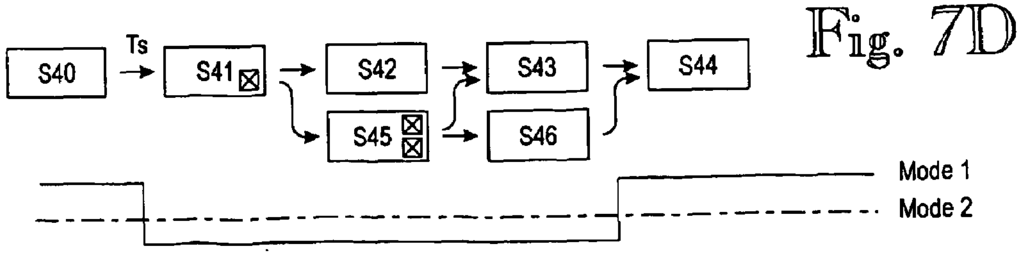

In the options presented in FIGS. 7A to 7C the transition between the first mode and the second mode has been activated and authorized by the user by actuating an object identification arranged into the screen of the user terminal. In another modification of the embodied solution, as shown in FIG. 7D, in creating the content, the designer of the slides defines whether the slide leads to transition between the first mode and the second mode or not. The user terminal in the first mode displays slide S40 and after an interval Ts displays slide S41. However, the slide S41 comprises a question addressed to the user and in order to ensure that the user will not unintentionally miss the question, slide S41 has been defined to transition the user terminal into the second mode directly when S41 is displayed. In the second mode the slide S41 remains displayed on the screen unless the user explicitly authorizes the transition back to the first mode by pushing a <clear> button arranged on the screen, which leads the process to a slide currently timed for display. In FIG. 7D advancing to the next slide S42 is shown, but naturally the identity of the next slide to be displayed depends on the time the user takes to remain in the second mode. After slide S42 the slides S42 to S44 are displayed according to the pre-defined synchronization.

The other possibility to continue from slide S41 is to answer to the question by activating the on-screen button of S41, which leads the procedure to slide S45. In FIG. 7D slide S45 is also an interactive slide requesting a confirmation to the answer provided in slide S41, and is thus associated with the second mode. Confirming the given answer by activating the on-screen button in the screen leads to displaying the slide S46 that comprises a message thanking for the answer. Slide S46, on the other hand, is also defined to transition the user terminal from the second mode to the first mode and thereby terminate the interactive functionality.

In the first embodiment the order defined by the media system was the pre-defined timing of the slides. In some systems the content may also be pushed spontaneously from the server to the terminal, which in conventional operation will override any other content viewing in the terminal. In the invented solution such overriding may happen only if the terminal is in the first mode, and therefore open for the new display order as pushed by the system. If the user terminal is in the second mode, the display status will not change unless appropriately authorized. The authorization may be given as described earlier, for example, by the user action, user inactivity, or an incoming signal.

In case of active push services, the user terminal may be arranged to give an indication of the new content to the user, for example in form of a signal tone, flashing of the keyboard, or sign may appear in a particular information section of the screen. In noticing this, the user may decide whether to interrupt the ongoing browsing activity to check for the new incoming information, or finalize the activity before entering the new display order provided by the content server.

In the first embodiment the first and of the second mode have been implemented by the user terminal. It is also possible that the operation modes are arranged into the content server 130. In such embodiment, the mode selection module 414 of the user terminal 150 is configured to generate and transmit a signal to the content server 130 whenever a mode transition occurs in the user terminal 150. In response to the received indication the content server 130 will either spontaneously resume pushing new content to the user terminal (second mode->first mode), or refrain from pushing new content to the user terminal (first mode->second mode).

Figure 8:
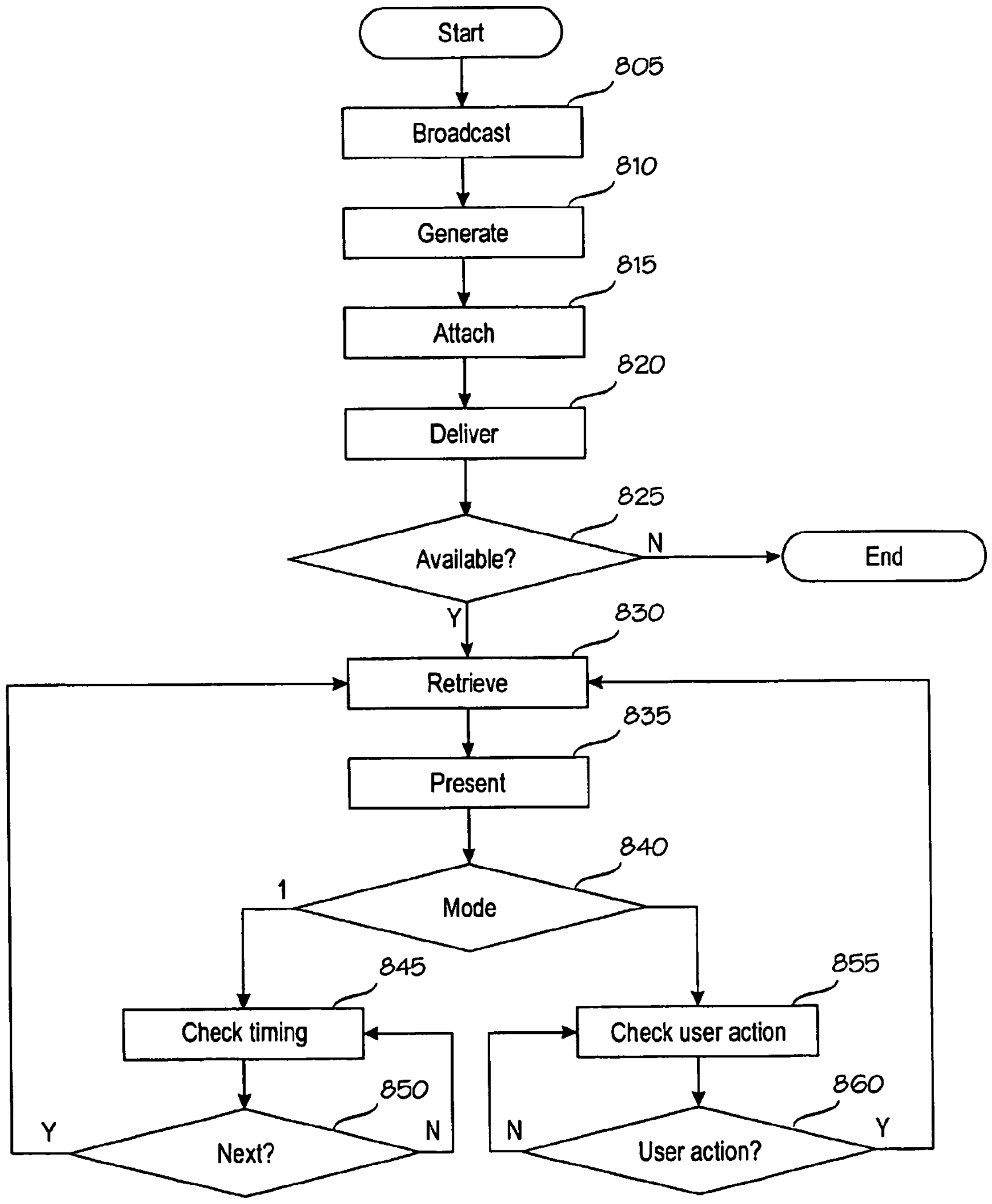
FIG. 8 illustrates the step of the embodied method.

The flow chart of FIG. 8 illustrates the step of the embodied method of presenting content associated with broadcast program in a user terminal of a telecommunication system. In step 805 a media stream is broadcast by a broadcast transmitting system. In step 810 a group of one or more content items comprising one or more visual, acoustic or tactile content objects of presentation, associated with the media stream, are generated. Example of such content object is a text string, a picture, a video clip, an audio clip, a game, a logo, a screen saver, a ringing tone, or the like, a series of these or any combination thereof. In step 815 timing info is attached to the content items for timing their presentation, and he content items are delivered (step 820) using the telecommunication system to a user terminal of the telecommunication system. In a user terminal, where such content is available, a content item with the attached timing relating to the current time is retrieved (step 830) from the content storage, and presented (step 835) in the user terminal. For a person skilled in the art, there are various ways to indicate the timing of a content item, which all fall in the scope of the invention. The timing may be given explicitly as an absolute time (for example, 31.1.2002 at 08:08:35 GMT), as a relative time from a defined starting point (for example, 3 seconds after the signal for advertisement break), a parameterized definition (for example, immediately as received), or the like.

At presenting the content it is checked whether the terminal currently operates in the first mode or in the second mode (step 840). If the terminal operates in the first mode, it is checked (step 845) whether the timing indicates that a new presentation element is necessary (step 850) or not. A presentation element refers to a group of effects that at one time may be output from the terminal without causing disturbing interference. A presentation element typically corresponds to a content item, and in principle an implementation specific definition. Such a presentation element may comprise, for example, a slide of a display, comprising a content item and a template. Such a presentation element may also comprise a short clip of a song played with the loudspeaker of the terminal, or a combination of simultaneous rhythmic blinking of the keyboard light and vibration of the terminal. For a person skilled in the art there are various possibilities for defining presentation items, and any such variations fall in the scope of the present invention. In case it is considered that some functionality, for example incoming call, does not cause disturbing interference, it is not considered part of presentation element, and appears neutral to the operation modes described herein.

If a new presentation element is necessary, new content will be retrieved, basically from the content storage (back to step 830). If no, the presentation of the current slide will continue. If the terminal operates in the second mode, it is checked (step 855) whether the user has entered a user activity. If yes, content will be retrieved, basically from the content storage or through a session with an access point (back to step 830). If no, the presentation of the current slide will continue.

It will be obvious to a person skilled in the art that, as the technology advances, the inventive concept can be implemented in various ways. The invention and its embodiments are not limited to the examples described above but may vary within the scope of the claims.

The invention claimed is:

1. A method, comprising:

presenting content associated with broadcast program in a user terminal of a telecommunication system, the method comprising:

broadcasting a media stream by a broadcast system;

generating a group of content items associated with the media stream;

attaching to the content items timing information to indicate the timing for presenting a content item;

delivering the group of content items with the timing information to the user terminal;

presenting the content items in the user terminal in a first mode wherein a presentation element corresponding to a content item is changed to another presentation element according to the timing information of the content item, or in a second mode wherein a presentation element is changed to another presentation element in response to a user action; and allowing transition from the second mode to the first mode only by authorization according to a pre-defined procedure.

2. A method according to claim 1, further comprising:

generating the group of content items to correspond with one program or a segment of one program of the media stream;

storing the group of content items in the user terminal; and retrieving, when the user terminal is in the first mode, a content item for presentation according to the timing information.

3. A method according to claim 1, further comprising authorizing the transition from the second mode to the first mode in response to an authorizing signal received from a telecommunication system.

4. A media system comprising:

a broadcast system, a telecommunication system, a content processing system, and a user terminal, wherein the broadcast system is configured to broadcast a media stream;

the content processing system is configured to generate a group of content items associated with the media stream;

the content processing system is configured to attach to the content items timing information to indicate the timing for presenting a content item;

the user terminal is configured to present the content items in the user terminal in a first mode, wherein a presentation element corresponding to a content item is changed to another presentation element according to the timing information of the content item, or in a second mode wherein a presentation element is changed to another presentation element in response to a user action; and the user terminal is configured to transit from the second mode to the first mode only by authorization according to a pre-defined procedure.

5. A system according to claim 4, wherein the user terminal is configured to provide a presentation element as a slide in the terminal display; and to include in the presentation element a display element for activating a user action that transits the user terminal from the first mode to the second mode.

6. A system according to claim 4, wherein the content processing system is configured to generate the group of content items to correspond with one program or a segment of one program of the media stream;

the user terminal is configured to store the group of content items in the user terminal; and the user terminal is configured to retrieve, when the user terminal is in the first mode, a content item for presenting according to the timing information.

7. A system according to claim 4, wherein the content processing system is configured to generate a content item while broadcasting the associated program in the media stream; and the content processing system is configured to indicate in the timing information that the content item is to be presented immediately at reception.

8. An apparatus, comprising:

a user terminal configured to operate in a telecommunication system comprising;

a broadcast receiver, configured to receive a broadcast media stream from a media system;

an interaction engine configured to receive a group of content items associated with the media stream with timing information to indicate the timing for presenting a content item;

a rendering engine configured to present the content items in the user terminal in a first mode wherein a presentation element corresponding to a content item is changed to another presentation element according to the timing information of the content item, or in a second mode wherein a presentation element is changed to another presentation element in response to a user action; and a content processor configured to allow transition from the second mode to the first mode only by authorization according to a pre-defined procedure.

9. An apparatus according to claim 8, wherein the rendering engine is configured to provide a presentation element as a slide in the terminal display; and to include in the presentation element a display element for activating a user action that transits the user terminal from the first mode to the second mode.

10. An apparatus according to claim 9, wherein the display element is an on-screen button in the user interface of the user terminal.

11. An apparatus according to claim 8, wherein the interaction engine is configured to receive with the content item mode information to indicate whether displaying of the content item relates to a transition to the first mode of the user terminal or to the second mode of the user terminal; and the content processor is configured to change the mode of the apparatus according to the mode information of the displayed content item.

12. An apparatus according to claim 8, wherein the content processor is configured to enter the first mode from the second mode in response to authorization by a user action in the user terminal.

13. An apparatus according to claim 8, further comprising a timer controller module configured to measure the duration of a user inactivity while the user terminal is in the second mode; and the content processor is configured to allow entry to the first mode from the second mode in response to authorization by the duration of the user inactivity exceeding a pre-defined limit.

14. An apparatus according to claim 8, wherein the content processor is configured to allow entry to the first mode from the second mode in response to an authorizing signal received from a telecommunication system.

15. An apparatus according to claim 8, wherein the rendering engine is configured to display an indicator for indicating the current operating mode of the terminal.

16. An apparatus, comprising:

a server for a media system comprising a broadcast system, a telecommunication system, a content creation tool, and a user terminal;

a content delivery engine configured to receive from the content creation tool a group of content items associated with the media stream with timing information to indicate the timing for presenting a content item;

an interaction engine configured to receive from the user terminal a signal for indicating whether the user terminal is in a first mode wherein a presentation element corresponding to a content item is changed to another presentation element according to the timing information of the content item, or in a second mode wherein a presentation element is changed to another presentation element in response to a user action;

the interaction engine is configured to transmit content items to the user terminal when the user terminal is in a first mode; and the interaction engine is configured not to transmit content items when the user terminal is in a second mode.

17. An apparatus according to claim 16, wherein the interaction engine is configured to send to the user terminal an authorizing signal for authorizing transition to the first mode from the second mode.

18. A module for an apparatus comprising a user terminal configured to operate in a telecommunication system and to receive a broadcast media stream from a media system, the module comprising:

an interaction engine configured to receive a group of content items associated with the media stream with timing information to indicate the timing for presenting a content item;

a rendering engine configured to present the content items in the user terminal in a first mode wherein a presentation element corresponding to a content item is changed to another presentation element according to the timing information of the content item, or in a second mode wherein a presentation element is changed to another presentation element in response to a user action; and a content processor configured to allow transition from the second mode to the first mode only by authorization according to a pre-defined procedure.

19. A module according to claim 18, wherein the interaction engine is configured to receive with the content item mode information to indicate whether displaying of the content item relates to a transition to the first mode of the user terminal or to the second mode of the user terminal; and the content processor is configured to change the mode of the apparatus according to the mode information of the displayed content item.

20. A module according to claim 18, wherein the content processor is configured to allow entry to the first mode from the second mode in response to an authorizing signal received from a telecommunication system.

21. A method, comprising:

operating as a user terminal in a telecommunication system;

receiving a broadcast media stream from a media system;

receiving a group of content items associated with the media stream with timing information to indicate the timing for presenting a content item;

presenting the content items in the user terminal in a first mode wherein a presentation element corresponding to a content item is changed to another presentation element according to the timing information of the content item, or in a second mode wherein a presentation element is changed to another presentation element in response to a user action; and allowing transition from the second mode to the first mode only by authorization according to a pre-defined procedure.

22. A method according to claim 21, further comrpising:

providing a presentation element as a slide in a terminal display; and including in the presentation element a display element for activating a user action that transits the user terminal from the first mode to the second mode.

23. A method according to claim 21, further comprising:

receiving with the content item mode information to indicate whether displaying of the content item relates to a transition to the first mode of the user terminal or to the second mode of the user terminal; and changing the mode of the user terminal according to the mode information of the displayed content item.

24. A method, comprising:

operating as a server for a media system comprising a broadcast system, a telecommunication system, a content creation tool, and a user terminal;

receiving from the content creation tool a group of content items associated with the media stream with timing information to indicate the timing for presenting a content item;

receiving from the user terminal a signal for indicating whether the user terminal is in a first mode wherein a presentation element corresponding to a content item is changed to another presentation element according to the timing information of the content item, or in a second mode wherein a presentation element is changed to another presentation element in response to a user action;

transmitting content items to the user terminal when the user terminal is in a first mode; and not transmitting content items when the user terminal is in a second mode.

25. A method according to claim 24, further comprising:

sending to the user terminal an authorizing signal for authorizing transition to the first mode from the second mode.

26. A computer-readable memory encoded with instructions that, when executed by a computer, perform:

operating as a user terminal in a telecommunication system;

receiving a broadcast media stream from a media system;

receiving a group of content items associated with the media stream with timing information to indicate the timing for presenting a content item;

presenting the content items in the user terminal in a first mode wherein a presentation element corresponding to a content item is changed to another presentation element according to the timing information of the content item, or in a second mode wherein a presentation element is changed to another presentation element in response to a user action; and allowing transition from the second mode to the first mode only by authorization according to a pre-defined procedure.

27. A computer-readable memory according to claim 26, the instructions further performing:

providing a presentation element as a slide in a terminal display; and including in the presentation element a display element for activating a user action that transits the user terminal from the first mode to the second mode.

28. A computer-readable storage memory according to claim 26, the instructions further performing:

receiving with the content item mode information to indicate whether displaying of the content item relates to a transition to the first mode of the user terminal or to the second mode of the user terminal; and changing the mode of the user terminal according to the mode information of the displayed content item.

* * * * *

UNITED STATES PATENT AND TRADEMARK OFFICE

CERTIFICATE OF CORRECTION

PATENT NO. : 7,551,888 B2
APPLICATION NO. : 10/511771
DATED : June 23, 2009
INVENTOR(S) : Toni Kopra et al.

It is certified that error appears in the above-identified patent and that said Letters Patent is hereby corrected as shown below:

In the Claims

Column 14, Claim 8, line 3: "system comprising;" should be --system;--.

Column 15, Claim 18, lines 28 and 29: "and a content processor" should be --and (new line) a content processor--.

Signed and Sealed this

Twenty-second Day of September, 2009

David J. Kappos

David J. Kappos
*Director of the United States Patent and Trademark Office*